March 5, 1968 — T. S. PASPALAS — 3,371,659
THROW-AWAY PORTABLE STOVE
Filed Sept. 14, 1966 — 3 Sheets-Sheet 1
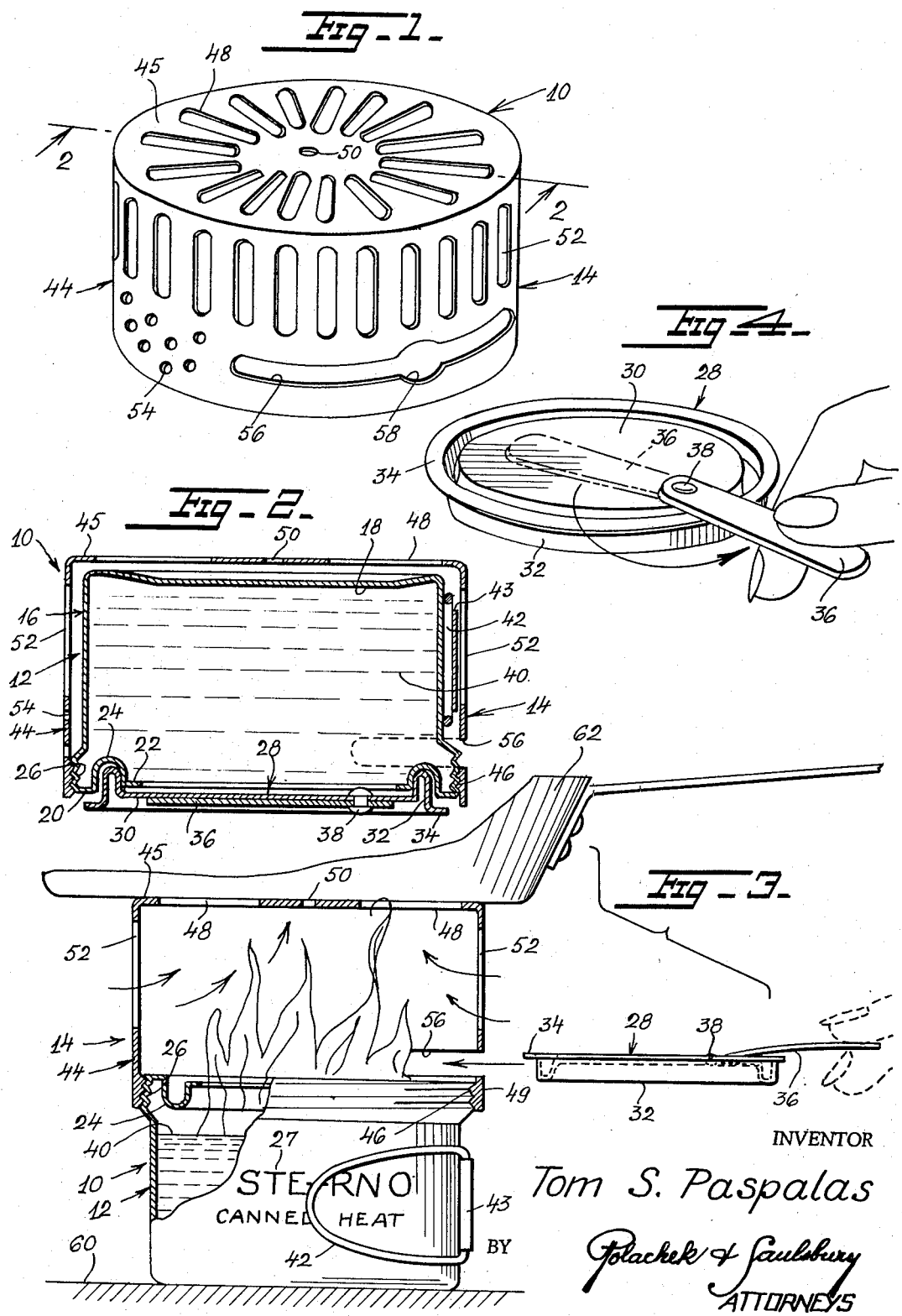
INVENTOR
Tom S. Paspalas
BY Polachek & Saulsbury
ATTORNEYS

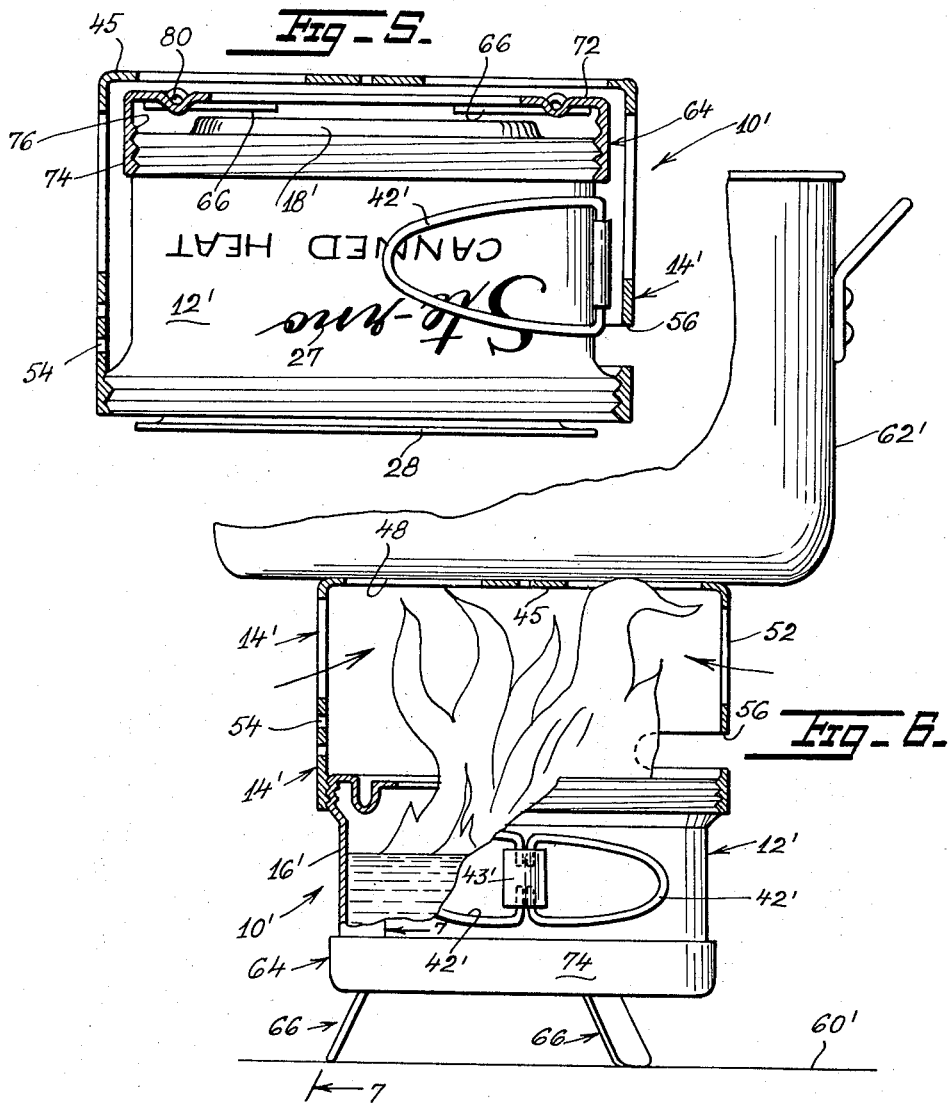
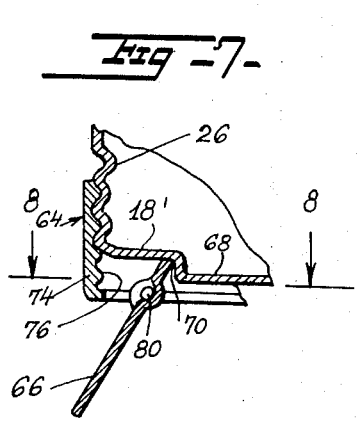
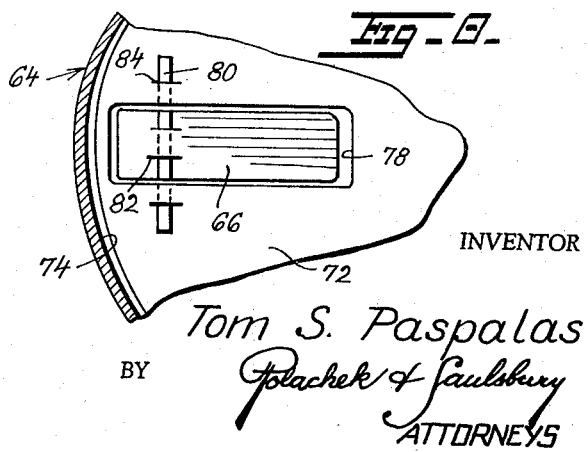

March 5, 1968     T. S. PASPALAS     3,371,659
THROW-AWAY PORTABLE STOVE
Filed Sept. 14, 1966     3 Sheets-Sheet 3
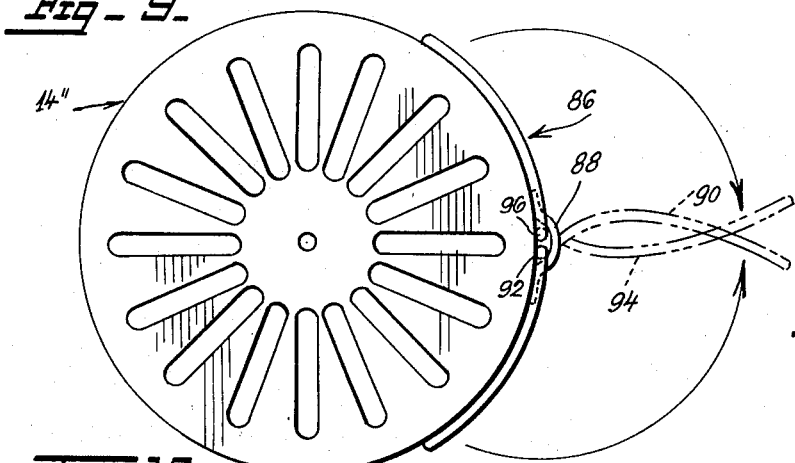
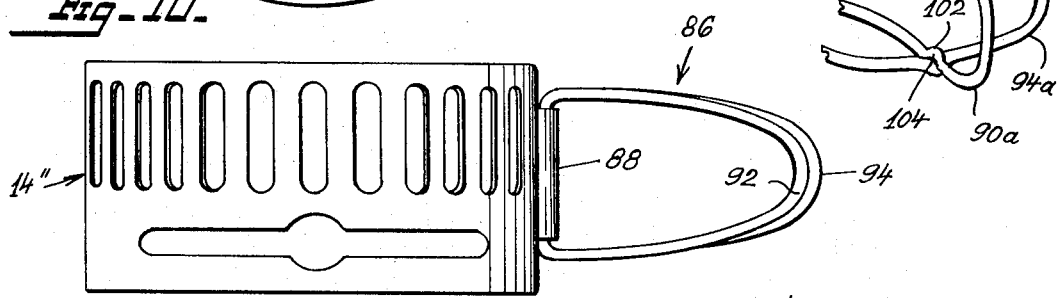
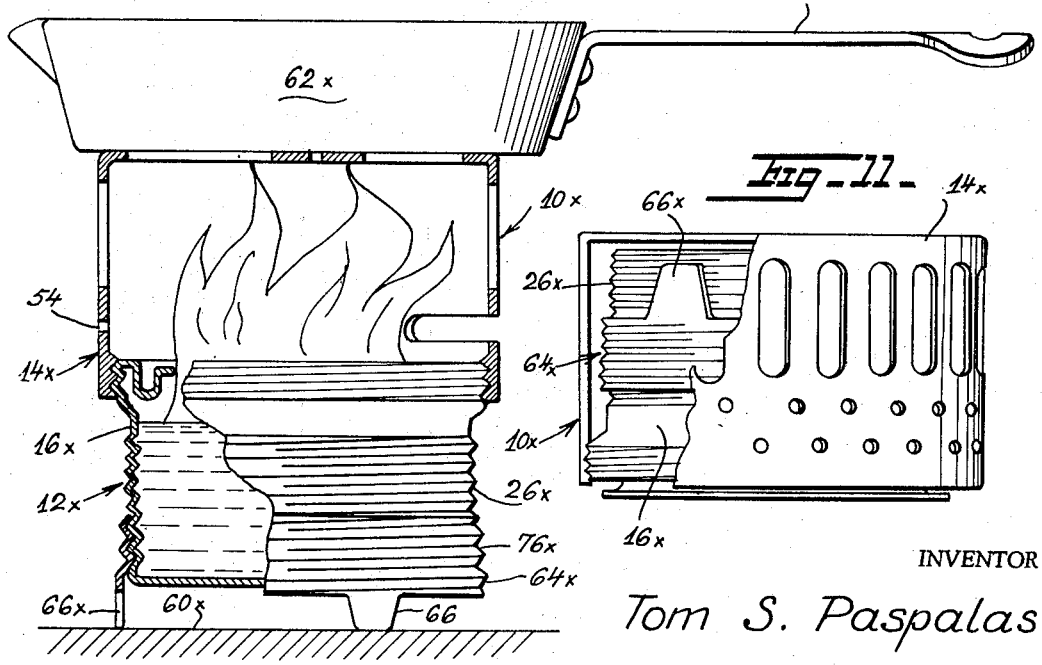
INVENTOR
Tom S. Paspalas
BY Polachek & Saulsbury
ATTORNEYS United States Patent Office 3,371,659
Patented Mar. 5, 1968

3,371,659
THROW-AWAY PORTABLE STOVE
Tom S. Paspalas, 34 Mt. Vernon Ave.,
Bloomfield, N.J. 07003
Filed Sept. 14, 1966, Ser. No. 579,236
6 Claims. (Cl. 126—43)

ABSTRACT OF THE DISCLOSURE

A throw-away stove having a portable stove unit with a container of solidified fuel inside a ventilated housing. The container is removable from the housing and when inverted is adapted to support the housing which in turn is adapted to support a cooking vessel.

---

This invention relates generally to new and useful improvements in throw-away portable heaters and more particularly to a compact portable stove unit having a ventilated cylindrical outer cover or housing removably fastened.

It is a principal object of the present invention to provide a portable heater unit with a ventilated cylindrical housing removably fastened to be inverted and fastened, which will then serve as a support for a cooking vessel.

Another object of the invention is to provide a portable heater of simple construction which is so economical to manufacture that it can be thrown away when the supply of fuel is exhausted.

A further object of the invention is to provide a portable stove arranged to carry its own heating means.

Yet another object of the invention is to provide a portable stove that is compact but uniquely designed to be sturdy while rendering efficient heating.

A still further object of the invention is to provide a portable stove having a support base or stand uniquely fastened.

Broadly the invention comprises a portable stove unit having a container of solidified fuel, known as canned heat, fitted inside a ventilated cylindrical cover or housing. The container is adapted to be removed from the cylindrical cover or housing. By inverting the container, and fastening the cover or housing thereon, the cover or housing is in position to support a cooking vessel.

For further comprehension of the invention and of the objects and advantages thereof, reference should be had to the following description and accompanying drawings and to the appended claims in which the various novel features of the invention are more particularly set forth.

In the accompanying drawings forming a material part of this disclosure:

FIG. 1 is a top perspective view of a portable stove embodying one form of the invention.

FIG. 2 is a vertical sectional view taken on the plane of the line 2—2 of FIG. 1.

FIG. 3 is a part elevational and part sectional view of the stove of FIG. 1 shown in operative position for heating the contents of a cooking vessel, the lid being shown preparatory to insertion for cutting off the heat, parts being shown broken away.

FIG. 4 is a top perspective view of the lid for the container, the handle being shown in moved operative position.

Referring now in detail to the various views of the drawings, in FIG. 1 is a portable stove made in accordance with the invention and is illustrated and designated generally by the reference character 10. The stove 10 is formed of two parts, a container 12 and a ventilated cylindrical cover or housing 14.

With reference to FIG. 2, the container 12 has a cylindrical shaped body 16, closed at one end by an indented wall 18 and open at its other end. The open end of the body 16 is formed with an inwardly extending inner annular flange 20, an inwardly extending outer annular flange 22 on the same plane as flange 20 and an integral intermediate looped portion 24 between the flanges. The open end of the body is formed with screw threads 26 for a short distance inwardly. The outer surface of the body of the container may have identifying indicia 27 such as "Sterno Canned Heat" printed thereon. A metal lid 28 as best seen in FIG. 4 of the same material as the body 16 is adapted to close and is shown as closing the open end of the container 12 in FIG. 2. The lid 28 has a thin flat body portion 30 formed with an intended looped portion 32 and terminating in an annular peripheral flange 34. A handle in the form of an elonagted rectangular-shaped plate 36 is pivoted at one end to the body of the lid by means of a pivot pin 38. The handle is adapted normally to rest flatwise on the outer flat surface of the body of the lid 28 as shown in full lines in FIG. 2 and in dash lines in FIG. 4. When the lid is in closed position as shown in FIG. 2, the indented looped portion 32 is press-fitted into the looped portion 24 of the body 16 of the container 12.

The container 12 holds a supply of fuel 40 of the solidified fuel type like Sterno, which burns with a very hot blue flame, without smoke. A split looped wire handle 42 may be hingedly fastened to the body of the container by means of a tubular keeper 43. The body of the handle may be slightly curved to conform to the curvature of the body of the container.

Referring particularly to FIGS. 1 and 3, the cover or housing 14 has a ventilated cylindrical-shaped body 44 closed at one end by a wall 45 and is open at its other end. The body is formed with internal screw threads 46 at its outer open end edge and is provided with a plurality of closely spaced, closed radial slots 48 in its end wall 45, radiating from a central hole 50 therein and with a plurality of closely spaced vertically disposed closed slots 52 in its side together with a cluster of small holes 54 in its side below the slots 52. An elongated curved closed slot 56 is formed in the side of the body of the container below the slots 52, the slot 56 being formed with an enlargement 58 midway its ends.

The stove 10 is marketed with the cover or housing 14 enveloping the container 12 with its free open end threaded onto the threads 26 of the container as shown in FIG. 2. In use, the cover or housing 14 is unscrewed from the container 12 whereupon the lid 28 may then be pried off by turning the handle 36 around to the extended position shown in FIG. 4 and directing pressure outwardly on the handle against the lid. The container may then be placed with its end wall 18 on a supporting surface 60 with its open end opening upwardly as shown in FIG. 3. The threaded end of the cover or housing 14 is then threaded onto the top threaded end 26 of the container 12, forming an extension of the container as shown in FIG. 3. A lighted match or taper may be inserted through the enlargement 58 of the slot 56 of the cover or housing and the fuel ignited. The stove is now ready to heat food or the like by placing a cooking vessel 62 with food therein on the top wall 45 of the cover or housing as shown in FIG. 3. Combustion takes place in the top of the container 12 and in the interior of the cover or housing 14, air being supplied thereto by the plurality of slots 48 and 52 and holes 54 in the cover or housing. The combustion products including the heated air, etc. pass upwardly through the outlet slots 48 and hole 50. When it is desirable to extinguish the flame, the lid 28 is inserted through the slot 56 of the cover or housing.

In FIGS. 5 to 8, inclusive, a portable stove 10′ is illustrated, embodying a modified form of the invention. The stove 10' differs from stove 10 of FIG. 1 in the construction of the container 12', the construction of the cover or housing 14' being the same as the cover or housing 14 and similar reference characters are used to identify similar parts.

In this form of the invention, the closed end of the container 12' is constructed and shaped to accommodate a circular pan-shaped base or adapter 64 carrying collapsible legs 66 for supporting the stove on a supporting surface 60'. For this purpose, the end wall 18' of the body 16' of the container 12' is formed with a central extended portion 68 instead of being indented as shown in FIG. 2. The end wall 18' and extended portion 68 define an annular shoulder 70.

The pan-shaped base or adapter 64 is formed with a shallow pan-shaped body having a flat bottom 72 with a peripheral flange 74 formed with internal screw threads 76. The flat bottom 72 of the adapter or base is formed with opposed elongated rectangular-shaped openings 78. A correspondingly shaped plate is pivotally mounted in each opening, the plates constituting the legs 66. The mounting of the legs includes a pivotal shaft 80 extending across the plate, adjacent one end thereof, and therebeyond, and secured thereto by spaced looped bearings 82. Each shaft extends across its respective opening and has its ends journalled in looped bearings 34 fixed on the surface of the flat bottom of the base or adapter. The legs 66 when in normal collapsed condition occupy substantially the area of the openings as shown in FIG. 8, but when extended as shown in FIG. 7 serve as the legs 66 for supporting the stove on the supporting surface 60' as shown in FIG. 6. The plates can be readily manually tilted to operative and inoperative positions by the finger of the user.

When marketing the stove 10', the legs 66 are swung to normal collapsed condition closing the openings in the flat body of the base or adapter. In use, the legs are tilted to outward position as shown in FIG. 7 in which position the short end of each leg engages the shoulder 70 thereby interlocking the legs in operative position, when the adapter 64 is tightened.

In stove 10', a pair of split wire handles 42' is shown hingedly mounted in a single keeper 43'. The stove 10' provides better base support than the stove 10 so that larger cooking vessel may be used such as the deep pot 62' shown in FIG. 6.

Similarly, it is noted that the cover or housing might have outwardly, tapering side walls to provide a larger supporting end wall surface.

In FIGS. 9 and 10, a modified form of cover or housing 14" adapted to be used with the containers 10 and 10' is shown. In this form of cover or housing 14", a sectional handle structure 86 is mounted on the body 14" of the cover or housing. The handle structure includes a tubular keeper 88 welded or otherwise fastened to the body 14" of the cover in vertical position. A looped wire handle section 90 has its bent ends 92 pivotally mounted in the keeper and another looped wire handle section 94 slightly longer and wider than the looped handle section 90 has its bent ends 96 pivotally mounted in the keeper, in side by side relation, so that the handle sections are adapted to be swung outwardly of the cover, in the direction of the arrows in FIG. 9, with the shorter handle section 90 extending through the longer handle section 94 and interlocked therewith as shown in dash lines in FIG. 9. When the cover or housing is thus provided with a handle structure, the stove may be readily carried by means of the handle structure.

In the modified form of handle structure 100 shown in FIG. 10a, the looped bodies of the handle sections 90a and 94a are formed with opposed interlocking bends 102 and dents 104, respectively, for yieldingly holding the handle sections together.

FIGS. 11 and 12 illustrate a portable stove 10x made in accordance with still another modified form of the invention. The stove 10x differs from the stove 10' shown in FIGS. 5 to 8, inclusive, in that the body 16x of the container 12x is externally screw threaded for substantially its entire length as indicated at 26x and instead of a base or adapter 64 with a bottom 72, an adapter in the form of a band or collar 64x is provided. The body of the band or collar 64x is formed with screw threads 76x for threading the band or collar downwardly on the threaded body 16x of the container. The band or collar is formed with integral downwardly extending lugs forming legs 66x for supporting the stove on a supporting surface 60x. When the stove is not in use, the band or collar 64x is threaded upwardly on the body 16x of the container 12x to a point midway its ends out of the way inside the cover 14x as seen in FIG. 11. The band or collar permits adjustment of the height of the stove for good supporting means.

The stove 10x is shown in operative position in FIG. 12 supporting a cooking vessel in the form of a pan 62x having an elongated handle 106.

The above described constructions provide a stove which is adapted for camping and other outdoor or temporary use as well as for military purposes. It provides for safe, simple and efficient operation and there are no working parts to become clogged, broken, lost or out of adjustment. At the same time, it furnishes a regulated supply of heat with maximum fuel utilization and efficiency in combustion, while it can be manufactured so economically that after the supply of fuel is exhausted the stove may be completely thrown away.

Furthermore, while I have illustrated and described the preferred embodiments of my invention, it is to be understood that I do not limit myself to the precise constructions herein disclosed and that various changes and modifications may be made within the scope of the invention as defined in the appended claims.

What is claimed is:

1. In a portable stove, an outer hollow cylindrical cover, a removable cylindrical container normally nested in said cover and having a supply of solidified fuel, said container being open at one end, a removable lid closing the opening in the container, said container when removed adapted to serve as a heater and to support said cover, said cover having inlet slots and outlet slots, which slots when the cover is supported serve as air entrances and outlets for products of combustion, respectively, means in the cover for extinguishing the burning fuel, said cover when in supported condition adapted to support a cooking vessel at a level spaced from the container, the cover being formed with additional holes for admission of air and being formed with an elongated slot having an enlargement midway its ends for admission of air and for admission of a device for igniting the fuel in the container.

2. A portable stove as defined in claim 1 wherein the cover has a central hole and the outlet slots therein radiate from said central hole, the air inlet slots being disposed vertically on the side of the cover.

3. A portable stove as defined in claim 1 wherein the means in the cover for igniting the fuel includes an elongated opening in the side of the cover curved to conform to the curvature of the cover, said opening having an enlarged portion midway its ends, communicating with the interior of the container and the cover and adapted to receive a lighted match or the like for igniting the fuel.

4. A portable stove as defined in claim 1 wherein the means for extinguishing the burning fuel includes an elongated slot in the side of the cover having a curve conforming to the curvature of the body of the cover, said slot adapted to receive the lid of the container when removed for closing the opening in the container whereby the burning is shut off, said container cover having a handle for manipulating the same.

5. A portable stove as defined in claim 1 wherein the container is provided with screw threads along its closed end and a removable adapter having a screw threaded body adapted to be threaded onto the threads at the closed end of the container, said adapter carrying collapsible legs for supporting the container and supported cover on a supporting surface, when the container is removed from the cover, said container having a collapsible carrying handle.

6. A portable stove as defined in claim 1 wherein the body of the container is formed with screw threads extending from its closed end inwardly to a point remote from the open end of the container, a collar removably mounted on the body, said collar having screw threads coacting with the threads on the closed end of the container, and integral spaced lugs depending from the collar and serving as legs for supporting the stove when the collar is mounted on the container.

References Cited
UNITED STATES PATENTS

| | | | |
|---|---|---|---|
| 936,482 | 10/1909 | Seely | 126—43 |
| 1,277,872 | 9/1918 | Crane | 126—43 |
| 1,373,828 | 4/1921 | Nottingham | 126—38 |
| 2,877,759 | 3/1959 | Giese | 126—43 |
| 3,152,585 | 10/1964 | Harrison | 126—43 X |

FOREIGN PATENTS 188,229  11/1922  Great Britain.

FREDERICK L. MATTESON, JR., *Primary Examiner.*

E. G. FAVORS, *Assistant Examiner.*